(12) United States Patent
Kim et al.

(10) Patent No.: US 10,960,926 B2
(45) Date of Patent: Mar. 30, 2021

(54) SMART PARKING ASSIST SYSTEM AND METHOD

(71) Applicant: MANDO CORPORATION, Pyeongtaek-si (KR)

(72) Inventors: Jae Suk Kim, Yongin-si (KR); Hyeong Min Woo, Seongnam-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 0 days.

(21) Appl. No.: 15/355,986

(22) Filed: Nov. 18, 2016

(65) Prior Publication Data
US 2017/0144656 A1  May 25, 2017

(30) Foreign Application Priority Data
Nov. 19, 2015  (KR) .......................... 10-2015-0162678

(51) Int. Cl.
   *B62D 15/02* (2006.01)
(52) U.S. Cl.
   CPC .................. *B62D 15/0285* (2013.01)
(58) Field of Classification Search
   CPC ...... B62D 5/0463; B62D 7/159; B62D 6/008; B62D 6/003; B60T 8/1755
   USPC ............................................................ 701/41
   See application file for complete search history.

(56) References Cited

U.S. PATENT DOCUMENTS

| 9,283,960 | B1* | 3/2016 | Lavoie | B60W 30/06 |
| 9,676,414 | B2* | 6/2017 | Oyama | B62D 15/0285 |
| 2010/0235053 | A1* | 9/2010 | Iwakiri | B62D 15/027 |
| | | | | 701/42 |
| 2016/0280263 | A1* | 9/2016 | Mori | B62D 15/027 |

FOREIGN PATENT DOCUMENTS

KR  10-2013-0126168 A  11/2013

* cited by examiner

*Primary Examiner* — Maceeh Anwari
(74) *Attorney, Agent, or Firm* — Hauptman Ham, LLP (57) ABSTRACT

Disclosed herein is a smart parking assist system may include: a forward object sensing unit, a lateral object sensing unit, a rearward object sensing unit, an object distance calculation unit configured to calculate distance from a lateral object and a rearward object, a parking control unit, and a steering angle adjusting unit. The parking control unit recognizes left parallel exiting, right parallel exiting or perpendicular exiting based on a distance from a forward object sensed through the forward object sensing unit, a distance from a rearward object sensed through the rearward object sensing unit, and a distance from a lateral object sensed through the lateral object sensing unit, and controls steering angle adjustment such that the vehicle moves through the recognized left parallel exiting, right parallel exiting or perpendicular exiting. The steering angle adjusting unit adjusts a steering angle according to steering control signal of the parking control unit.

6 Claims, 5 Drawing Sheets

[Example of perpendicular exiting]
No forward object sensed
Distance from lateral object
< 2M

SMART PARKING ASSIST SYSTEM AND METHOD

CROSS-REFERENCE(S) TO RELATED APPLICATIONS

This application claims priority to Korean Patent Application No. 10-2015-0162678, filed on Nov. 19, 2015, the disclosure of which is incorporated herein by reference in its entirety.

BACKGROUND OF THE INVENTION

Field of the Invention

Exemplary embodiments of the present invention relate to a smart parking assist system and method, and more particularly, to a smart parking assist system and method which is capable of checking whether an obstacle exists at the front, side or rear of a vehicle, using a front, side or rear sensor, when a vehicle parked parallel or perpendicular in a parking lot is taken out of the parking lot, determining whether the vehicle can exit the parking lot, and informing a driver of an exiting direction or assisting the vehicle to exit along the exiting direction.

Description of the Related Art

These days, the parking problem is quite severe from the points of view of drivers. As the number of vehicles increases in a limited area, city and country, the parking space is inevitably reduced.

In order to remove such a lack of parking space, a parking stall in which one vehicle can be parked has gradually shrunk in size. Furthermore, when several vehicles are parked together in a parking space having no parking stalls arranged therein, the clearance between the vehicles is inevitably reduced. In this case, a driver must check surrounding obstacles with the naked eye, and drive a vehicle in person to park the vehicle in the narrow parking space. Furthermore, the driver may have difficulties in taking the vehicle out of the narrow parking space.

Thus, a vehicle having an automated parking assist system mounted therein has been recently on the market, the automated parking assist system having a function of checking a video obtained by filming the surroundings of the vehicle and automatically parking the vehicle.

When a vehicle is parked parallel, other vehicles may be parked at the front and rear of the corresponding vehicle, and a curb may be positioned at a side of the vehicle. When the vehicle exits a parking space, the automated parking assist system acquires the parking state information of the vehicle by measuring a distance from the curb through sensors installed at the side of the vehicle. Then, a separate automated exiting system assists the vehicle to exit the parking space.

When a driver is intended to take the vehicle out of the parking lot after the vehicle is parked perpendicular or parallel depending on the environment of the parking lot, the vehicle performs exiting in three kinds of forms, for example, left parallel exiting, right parallel exiting and right perpendicular exiting.

At this time, the driver presses a SPAS (Smart Parking Assist System) function button to perform exiting. Specifically, the driver must press the button once to perform left parallel exiting, press the button twice to perform right parallel exiting, press the button three times to perform left perpendicular exiting, and press the button four times to perform right perpendicular exiting. Thus, the driver may feel inconvenience.

Therefore, in order to start the parked vehicle, the driver must select an exiting direction by checking the surroundings of the vehicle each time, and decide how many times the SPAS function button needs to be pressed according to the exiting direction. Thus, an error may occur with a time delay.

Patent Document 1: Korean Patent Publication No. 10-2013-0126168 published on Nov. 20, 2013.

SUMMARY OF THE INVENTION

The present invention has been made in view of the above problems, and it is an object of the present invention to provide a smart parking assist system and method which is capable of checking whether an obstacle exists at the front, side or rear of a vehicle, using a front, side or rear sensor, when a vehicle parked parallel or perpendicular in a parking lot is taken out of the parking lot, determining whether the vehicle can exit the parking lot, and informing a driver of an exiting direction.

Also, it is an object of the present invention to provide a smart parking assist system and method which is capable of checking whether an obstacle exists at the front, side or rear of a vehicle, using a front, side or rear sensor, when a vehicle parked parallel or perpendicular in a parking lot is taken out of the parking lot, determining whether the vehicle can exit the parking lot, and assisting the vehicle to exit along the corresponding exiting direction.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a smart parking assist system may include: a forward object sensing unit configured to sense an object at the front of a vehicle; a lateral object sensing unit configured to sense an object at a side of the vehicle; a rearward object sensing unit configured to sense an object at the rear of the vehicle; an object distance calculation unit configured to calculate distances from the objects sensed through the forward object sensing unit, the lateral object sensing unit and the rearward object sensing unit; a parking control unit; and a steering angle adjusting unit. The parking control unit is configured to recognize left parallel exiting, right parallel exiting or perpendicular exiting based on the distance from the forward object sensed through the forward object sensing unit, the distance from the rearward object sensed through the rearward object sensing unit, and the distance from the lateral object sensed through the lateral object sensing unit, and control steering angle adjustment such that the vehicle moves through the recognized left parallel exiting, right parallel exiting or perpendicular exiting. The steering angle adjusting unit is configured to adjust a steering angle according to a steering control signal of the parking control unit.

In accordance with another aspect of the present invention, a smart parking assist method may include the steps of: (a) sensing an object at the front, side or rear of a vehicle; (b) calculating a distance from the object sensed at the front, side or rear of the vehicle; (c) recognizing one or more exiting modes according to a distance relation between the vehicle and the object sensed at the front, side or rear of the vehicle; and (d) adjusting a steering angle according to the recognized exiting mode.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Referring to the accompanying drawings, exemplary embodiments of the present invention will be described in detail such that they can easily be carried out by a person with ordinary skill in the art to which the present invention pertains. The present invention can be embodied in various forms, and are not limited to the embodiments described herein.

In order to clearly describe the present invention, portions irrelevant to the description are omitted. Throughout the specification, like reference numerals denote the same or similar components.

Throughout the specification, when an element is referred to as being "connected" to another element, it may not only indicate that the elements are "directly connected" to each other, but also indicate that the elements are "electrically connected" to each other with another element interposed therebetween. Furthermore, when an element is referred to as "including" another element, it should be understood that it may not exclude other components, but include other elements, unless referred to the contrary.

When an element is referred to as being "above" another element, the former element may be positioned directly above the latter element, or another element may be interposed therebetween. On the contrary, when an element is referred to as being "directly above" another element, no element is interposed therebetween.

The terms such as first, second and third are used to describe various parts, components, regions, layers and/or sections, but not limited thereto. The terms are used only to distinguish any one part, component, region, layer or section from another element, component, region, layer or section. Thus, a first part, component, region, layer or section described later may be referred to as a second part, component, region, layer or section as long as they do not depart from the scope of the present invention.

The technical terms used herein are used only to describe a specific embodiment, and do not limit the present invention. The terms of a singular form may include plural forms unless referred to the contrary.

The meaning of "including" used in the specification specifies a certain characteristic, region, integer, step, stage, operation, element and/or component, and does not exclude an existence or addition of another characteristic, region, integer, step, stage, operation, element and/or component.

The terms such as "below" and "above", indicating relative spaces, may be used to easily describe the relation between one part and another part, which are illustrated in a drawing. Such terms may include not only a meaning intended in the drawing, but also another meaning or operation of a device in use. For example, when a device in the drawing is overturned, parts described as being "below" other parts may be described as being "above" the other parts. Therefore, the exemplary term "below" may include the meanings of both above and below. The device can be rotated by 90 degrees or different angles, and the terms indicating relative spaces may be analyzed according to the rotation.

The terms including technical or scientific terms used herein have the same meanings as the terms which are generally understood by those skilled in the art to which the present invention pertains, as long as they are differently defined. The terms defined in a generally used dictionary may be analyzed to have meanings which coincide with contextual meanings in the related art. As long as the terms are not clearly defined in this specification, the terms may not be analyzed as ideal or excessively formal meanings.

In this specification, the meaning of "exiting" may include an operation or process in which a vehicle leaves or exits the place where the vehicle is parked.

Hereafter, referring to the accompanying drawings, exemplary embodiments of the present invention will be described in detail such that they can easily be carried out by a person with ordinary skill in the art to which the present invention pertains. The present invention can be embodied in various forms, and are not limited to the embodiments described herein.

Figure 1:
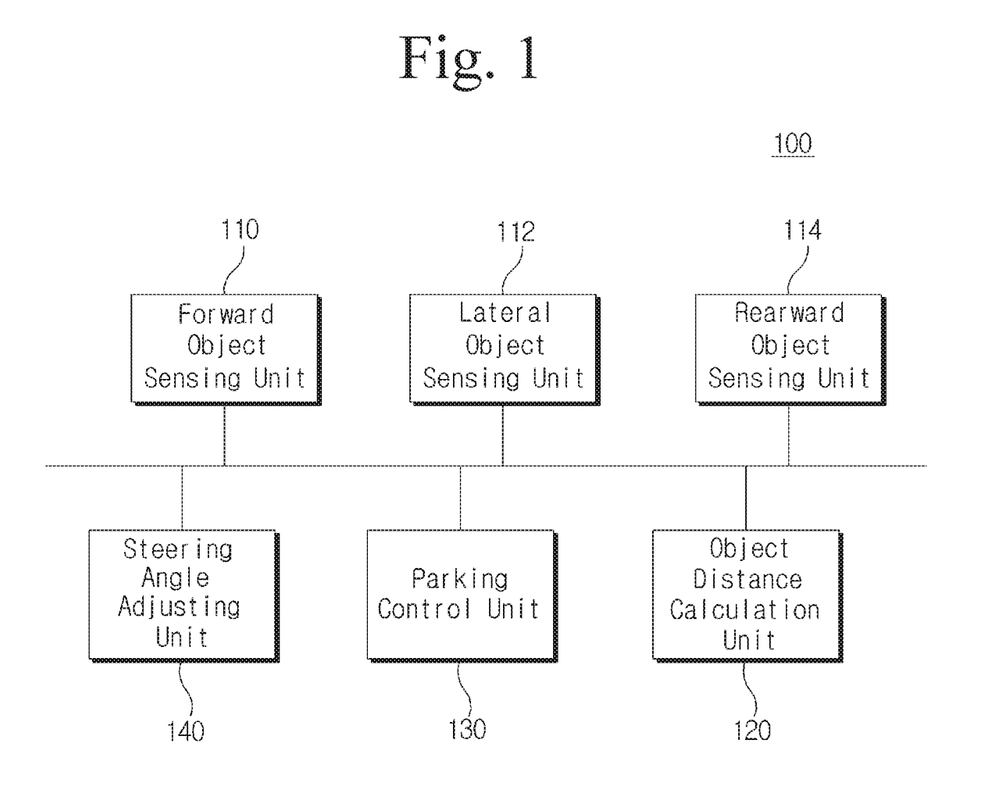
FIG. 1 is a diagram schematically illustrating the configuration of a smart parking assist system.

FIG. 1 is a diagram schematically illustrating the configuration of a smart parking assist system.

Referring to FIG. 1, the smart parking assist system 100 according to the embodiment of the present invention includes a forward object sensing unit 110, a lateral object sensing unit 112, a rearward object sensing unit 114, an object distance calculation unit 120, a parking control unit 130 and a steering angle adjusting unit 140.

The forward object sensing unit 110 senses an object at the front of a vehicle.

The lateral object sensing unit 112 senses an object at a side of the vehicle.

The rearward object sensing unit 114 senses an object at the rear of the vehicle.

The forward object sensing unit 110, the lateral object sensing unit 112 and the rearward object sensing unit 114 may sense a forward object, a lateral object and a rearward object, using a radar signal, for example.

The object distance calculation unit 120 calculates a distance between a vehicle and an object sensed through the forward object sensing unit 110, the lateral object sensing unit 112 or the rearward object sensing unit 114. For example, the object distance calculation unit 120 may measure a distance between the vehicle and a forward object, a rearward object or a lateral object, through an ultrasonic sensor.

When a forward object or rearward object is sensed through the forward object sensing unit 110 or the rearward object sensing unit 114, the parking control unit 130 determines whether the distance from the forward object or the rearward object is equal to or more than a first specific value. Furthermore, when the distance from the forward object or the rearward object is equal to or more than the first specific value, the parking control unit 130 senses a lateral object through the lateral object sensing unit 112. When a lateral object is sensed, the parking control unit 130 calculates a distance from the lateral object through the object distance calculation unit 120. When the distance from the lateral object is equal to or more than a second specific value, the parking control unit 130 recognizes the mode as left parallel exiting or right parallel exiting.

Furthermore, when no forward object or rearward object is sensed, a lateral object is sensed through the lateral object sensing unit 112, and a distance from the lateral object is less than the second specific value, the parking control unit 130 recognizes the mode as perpendicular exiting. In this case, the parking control unit 130 controls steering angle adjustment that the vehicle moves through the recognized exiting.

The first specific value is set to (whole length of vehicle+ 0.6 m), and the second specific value is set to 2 m.

The steering angle adjusting unit 140 adjusts a steering angle according to a steering control signal of the parking control unit 130.

When a forward object or rearward object is sensed, the parking control unit 130 checks whether a distance from the forward object or rearward object is equal to or more than (whole length of vehicle+0.6 m). When the distance is equal to or more than (whole length of vehicle+0.6 m), the parking control unit 130 senses a lateral object through the lateral object sensing unit 112. When a left-side object is sensed, the parking control unit 130 checks whether a distance from the left-side object is equal to or more than 2 m. When the distance from the left-side object is equal to or more than 2 m, the parking control unit 130 recognizes the mode as left parallel exiting. In this case, the parking control unit 130 controls steering angle adjustment that the vehicle moves through the recognized exiting.

When a forward object or rearward object is sensed, the parking control unit 130 checks whether a distance from the forward object or rearward object is equal to or more than (whole length of vehicle+0.6 m). When the distance is equal to or more than (whole length of vehicle+0.6 m), the parking control unit 130 senses a right-side object through the lateral object sensing unit 112. When a right-side object is sensed, the parking control unit 130 calculates a distance from the right-side object through the object distance calculation unit 120. When the distance from the right-side object is equal to or more than 2 m, the parking control unit 130 recognizes the mode as right parallel exiting, and controls steering angle adjustment that the vehicle moves through the recognized exiting.

When the distance from the forward object or the rearward object is less than (whole length+0.6 m) or the distance from the left-side object is less than 2 m, the parking control unit 130 recognizes that the vehicle does not attempt exiting.

When no forward object or rearward object is sensed through the forward object sensing unit 110 or the rearward object sensing unit 114, a lateral object is sensed through the lateral object sensing unit 112, and a distance from the lateral object is less than 2 m, the parking control unit 130 recognizes the mode as perpendicular exiting. In this case, the parking control unit 130 controls steering angle adjustment such that the vehicle moves through the recognized exiting.

When no objects are sensed through the forward object sensing unit 110, the lateral object sensing unit 112 and the rearward object sensing unit 114 and the distance from the lateral object is equal to or more than 2 m, the parking control unit 130 recognizes that the vehicle does not attempt exiting.

Figure 2:
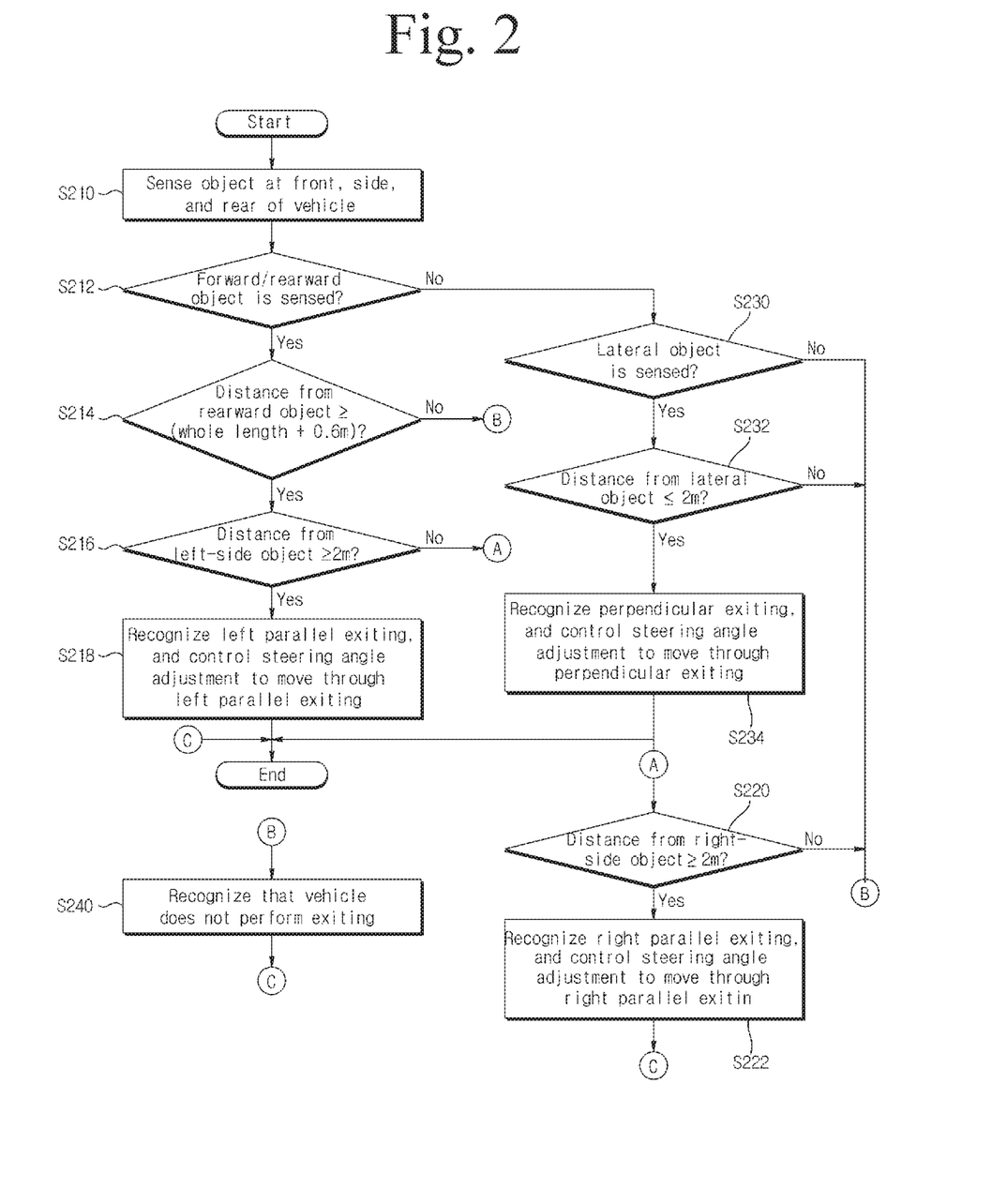
FIG. 2 is a flowchart for describing a smart parking assist method according to an embodiment of the present invention.

FIG. 2 is a flowchart for describing a smart parking assist method according to an embodiment of the present invention.

Referring to FIG. 2, the smart parking assist system 100 according to the embodiment of the present invention senses an object at the front, side or rear of a vehicle at step S210. That is, the smart parking assist system 100 transmits a radar signal to sense an object at the front, side or rear of the vehicle through the forward object sensing unit 110, the lateral object sensing unit 112 and the rearward object sensing unit 114.

Figure 3:
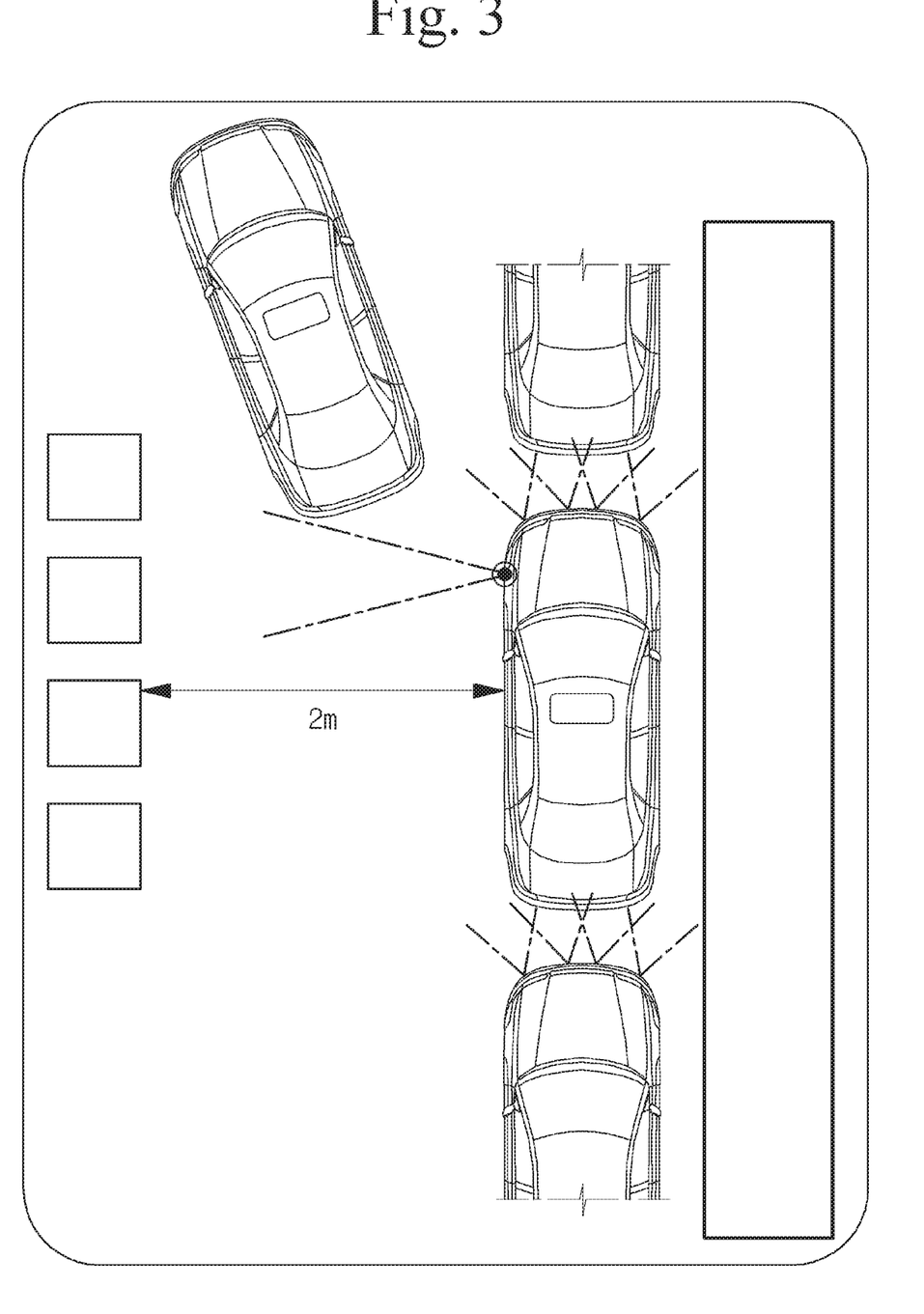
FIG. 3 is a diagram illustrating an example in which a vehicle moves through left parallel exiting.

Then, when a forward object is sensed through the forward object sensing unit 110 or a rearward object is sensed through the rearward object sensing unit 114 (Yes at S212), the parking control unit 130 calculates a distance from the forward object or rearward object. When the distance from the forward object or the rearward object is equal to or more than (whole length+0.6 m) (Yes step S214), the parking control unit 130 calculates a distance from a left-side object. When the distance from the left-side object is equal to or more than 2 m (Yes step S216), the parking control unit 130 recognizes the mode as left parallel exiting, as illustrated in FIG. 3. Then, the parking control unit 130 controls steering angle adjustment such that the vehicle moves through the left parallel exiting, at step S218. FIG. 3 is a diagram illustrating an example in which a vehicle attempts left parallel exiting.

Figure 4:
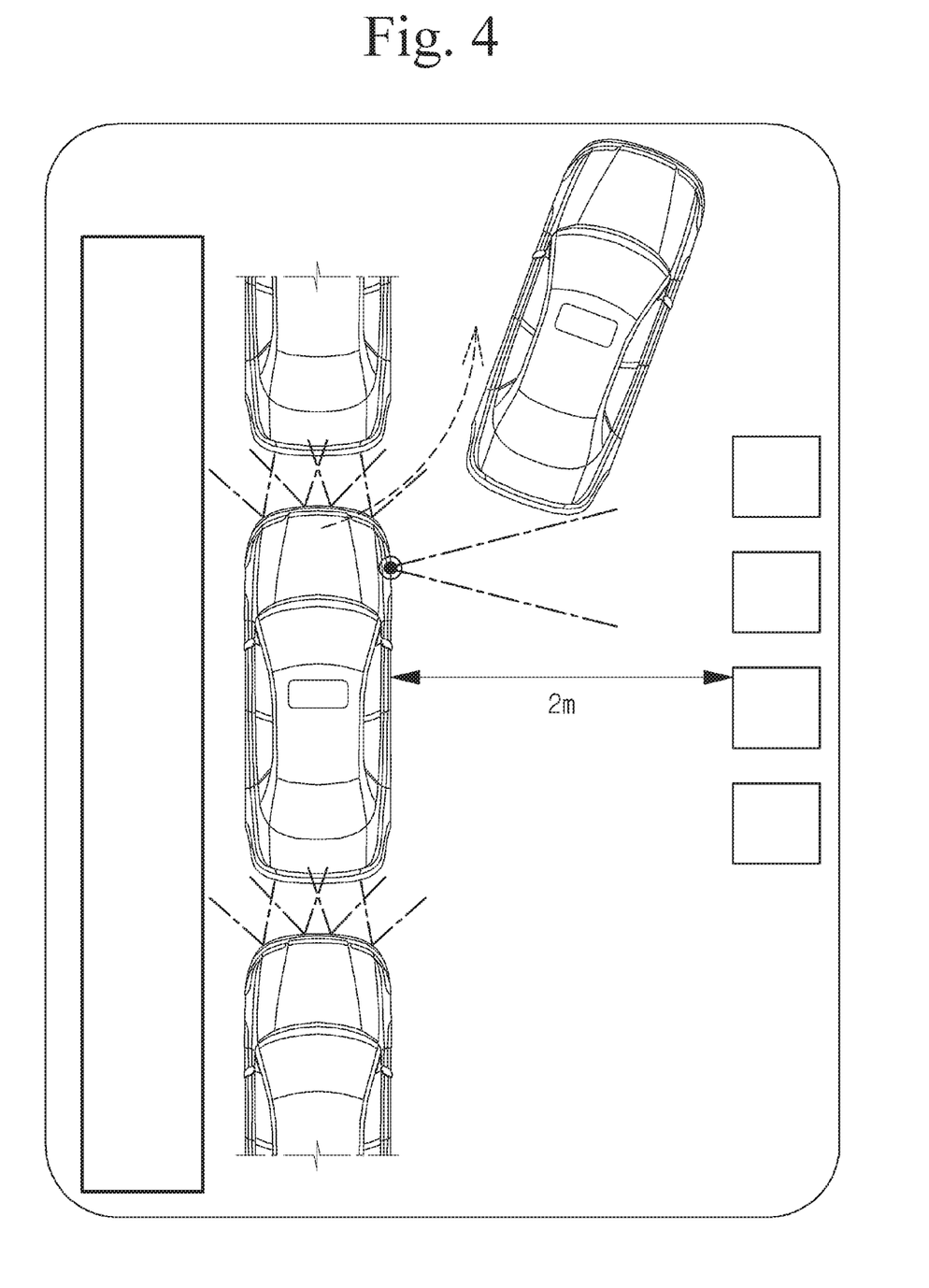
FIG. 4 is a diagram illustrating an example in which a vehicle moves through right parallel exiting.

However, when the distance from the forward object or rearward object is (whole length+0.6 m) and the distance from the left-side object is less than 2 m (No at step S216), the parking control unit 130 calculates a distance from a right-side object. When the distance from the right-side object is equal to or more than 2 m (Yes at step S220), the parking control unit 130 recognizes the mode as right parallel exiting, as illustrated in FIG. 4. Then, the parking control unit 130 controls steering angle adjustment such that the vehicle moves through the right parallel exiting, at step S222. FIG. 4 is a diagram illustrating an example in which a vehicle attempts right parallel exiting.

Figure 5:
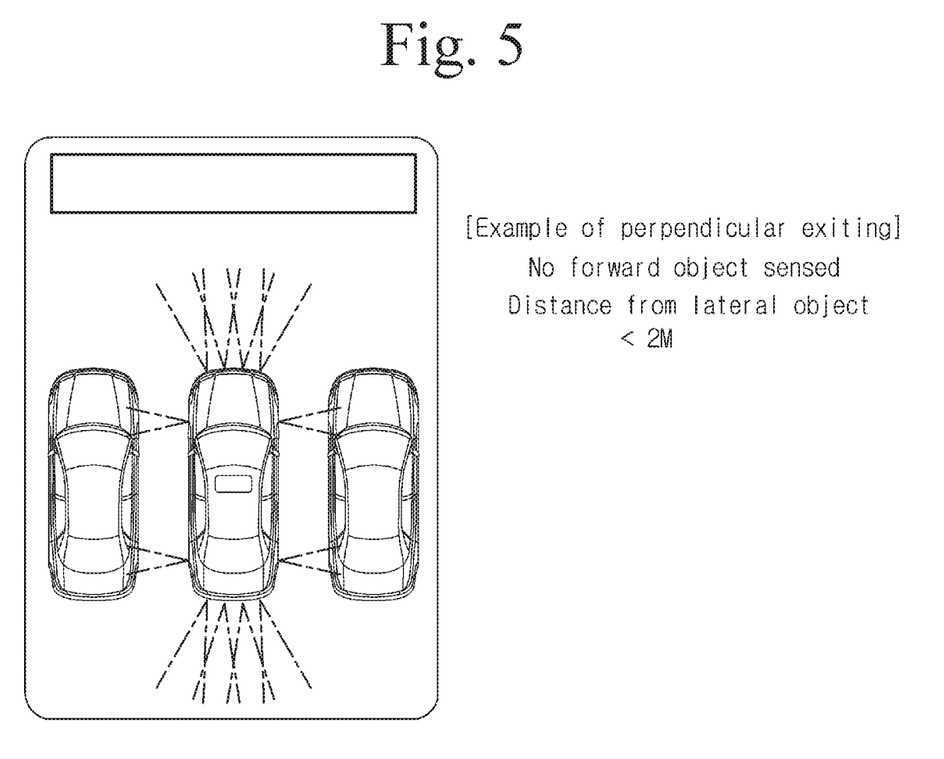
FIG. 5 is a diagram illustrating an example in which a vehicle moves through perpendicular exiting.

When no forward object or rearward object is sensed (No at step S212) and a lateral object is sensed through the lateral object sensing unit 112 (Yes at step S230), the parking control unit 130 calculates a distance from the lateral object. When the distance from the lateral object is less than 2 m (Yes at step S232), the parking control unit 130 recognizes the mode as perpendicular exiting, as illustrated in FIG. 5. Then, the parking control unit 130 controls steering angle adjustment such that the vehicle moves through perpendicular exiting, at step S234.

FIG. 5 is a diagram illustrating an example in which a vehicle attempts perpendicular exiting.

However, when no forward object or rearward object is sensed (No at step S212) and no lateral object is sensed (No at step S230), the parking control unit 130 recognizes that the vehicle does not attempt exiting, at step S240.

Furthermore, when the forward object or rearward object is sensed (Yes at step S212) and the distance from the forward object or the rearward object is less than (whole length+0.6 m) (No at step S214), the parking control unit 130 also recognizes that the vehicle does not attempt exiting, at step S240.

Furthermore, when the forward object or rearward object is sensed (Yes at step S212), the distance from the forward object or the rearward object is equal to or more than (whole length+0.6 m) (Yes at step S214), the distance from the left-side object is less than 2 m (No at step S216), and the distance from the right-side object is less than 2 m (No at step S220), the parking control unit 130 also recognizes that the vehicle does not attempt exiting, at step S240.

When no forward object or rearward object is sensed (No at step S212), the lateral object is sensed (Yes at step S230), and the distance from the lateral object is more than 2 m (No at step S232), the parking control unit 130 also recognizes that the vehicle does not attempt exiting, at step S240.

Thus, the steering angle adjusting unit 140 adjusts the steering angle according to control of the parking control unit 130, such that the vehicle performs left or right parallel exiting or performs right perpendicular exiting.

According to the embodiment of the present invention, the parking control unit 130 may be embodied by a processor which is connected to the forward object sensing unit 110, the lateral object sensing unit 112, the rearward object sensing unit 114, the object distance calculation unit 120 and the steering angle adjusting unit 140, in order to support smart parking. That is, when a forward object is sensed through the forward object sensing unit 110 or a rearward object is sensed through the rearward object sensing unit 114, the processor determines whether a distance from the forward object or the rearward object is equal to or more than a first specific value. When the distance from the forward object or the rearward object is equal to or more than the first specific value, the processor senses a lateral object through the lateral object sensing unit 112. When a lateral object is sensed, the parking control unit 130 calculates a distance from the lateral object. When the distance from the lateral object is equal to or more than a second specific value, the parking control unit 130 recognizes the mode as left parallel exiting or right parallel exiting. The processor may control steering angle adjustment such that the vehicle moves through the recognized exiting.

When no forward object or rearward object is sensed, the lateral object is sensed through the lateral object sensing unit, and the distance from the lateral object less than the second specific value, the processor recognizes the mode as perpendicular exiting. The processor may control steering angle adjustment such that the vehicle moves through the recognized exiting.

According to the embodiment of the present invention, the smart parking assist system and method may check whether an obstacle exists at the front, side or rear of a vehicle, through a front sensor, side sensor or rear sensor, during exiting of the vehicle parked parallel or perpendicular in a parking lot. The smart parking assist system and method may determine whether the vehicle can exit the parking stall, and inform a driver of the exiting direction.

Furthermore, the smart parking assist system and method can check whether an obstacle exists at the front, side or rear of the vehicle, through the front sensor, side sensor or rear sensor, during exiting of the vehicle parked parallel or perpendicular in a parking lot. Then, the smart parking assist system and method can assist the vehicle to exit along the exiting direction.

When a plurality of exiting paths are recognized, the smart parking assist system and method can display all of the exiting paths in case where a user selects an exiting select button. At this time, the smart parking assist system and method can assist the vehicle to exit through an exiting path selected by the driver among the plurality of exiting paths.

That is, the smart parking assist system and method can control steering angle adjustment such that the vehicle can enter the exiting path selected by the driver.

When the plurality of exiting paths are recognized, the smart parking assist system and method according to the embodiment of the present invention may calculate a distance to an exit through each of the exiting paths. The smart parking assist system and method can select the optimal exiting path among the plurality of exiting paths, the optimal exiting path having the shortest distance to the exit, and inform a driver of the optimal exiting path. Furthermore, the smart parking assist system and method can select the optimal exiting path among the plurality exiting paths, the optimal exiting path having the shortest distance to the exit, and assist the vehicle to exit through the optimal exiting path. That is, the smart parking assist system and method can control steering angle adjustment such that the vehicle can enter the optimal exiting path.

When the plurality of exiting paths are recognized, the smart parking assist system and method can calculate the number of turns (for example, the number of left turns and right turns) which are required until the vehicle arrives at the exit through each of the exit paths. The smaller the number of turns, the more conveniently the vehicle can exit. Thus, the smart parking assist system and method can select the optimal exiting path among the plurality of exiting paths, the optimal exiting path having the smallest number of turns required for exiting, and inform the driver of the optimal exiting path. Furthermore, the smart parking assist system and method can select the optimal exiting path among the plurality of exiting paths, the optimal exiting path having the smallest number of turns required for exiting, and assist the vehicle to exit through the optimal exiting path. That is, the smart parking assist system and method can control the steering angle such that the vehicle can enter the optimal exiting path.

In accordance with the embodiments of the present invention, the smart parking assist system and method can determine whether a vehicle can exit in a situation where the vehicle is parked parallel or perpendicular, and automatically select an exiting mode through the front and rear sensors. When the vehicle is switched from the parking state to the exiting state, the smart parking assist system and method can provide a more convenient function to a driver.

Furthermore, the smart parking assist system and method can automatically select left parallel exiting, right parallel exiting or right perpendicular exiting depending on a parallel parking or perpendicular parking state, and perform exiting, thereby removing inconvenience when a driver selects an exiting mode.

Furthermore, even when a driver has difficulties in exiting because an object exists around a vehicle, the smart parking assist system and method can determine the parked state, and automatically perform the corresponding exiting mode, thereby providing convenience to the driver.

While the present invention has been described with respect to the specific embodiments, it will be apparent to those skilled in the art that various changes and modifications may be made without departing from the spirit and scope of the invention as defined in the following claims.

What is claimed is:

1. An apparatus for automatically selecting an exiting mode of a vehicle, which has been parked in a parking spot, to operate the vehicle to leave from the parking spot, in a smart parking assist system, the apparatus configured to determine whether the vehicle exits in a situation where the vehicle has been parked parallel or perpendicular, by using one or more object sensing units to sense one or more obstacles existed around the vehicle parked in the parking spot, wherein the object sensing units of the apparatus comprises:
- a forward object sensing unit is configured to sense whether an object exists at the front of the vehicle parked in the parking spot;
- a lateral object sensing unit is configured to sense whether an object exists at a side of the vehicle parked in the parking spot; and
- a rearward object sensing unit is configured to sense whether an object exists at the rear of the vehicle parked in the parking spot, and
- the apparatus configured to perform, when the vehicle is determined to be able to leave from the parking spot, an exit of the vehicle to drive the vehicle from the parking spot by automatically selecting the exiting mode based on the sensed objects and distances from the sensed objects by using an object distance calculation unit, a parking control unit and a steering angle adjusting unit, wherein the apparatus further comprises:
- the object distance calculation unit is configured to calculate the distances from the objects sensed through the forward object sensing unit, the lateral object sensing unit and the rearward object sensing unit;
- the parking control unit is configured to
  - determine left parallel exiting, right parallel exiting, and perpendicular exiting based on the distance from a forward object sensed through the forward object sensing unit, the distance from a rearward object sensed through the rearward object sensing unit, and the distance from a lateral object sensed through the lateral object sensing unit, and
  - control steering angle adjustment to drive the vehicle from the parking spot such that the vehicle moves through the determined left parallel exiting, right parallel exiting, and perpendicular exiting; and
- the steering angle adjusting unit is configured to adjust a steering angle according to a steering control signal of the parking control unit,
- wherein when the forward object is sensed or a rearward object is sensed, the parking control unit determines whether a distance from the forward object or the rearward object is equal to or more than a first specific value,
- when the distance from the forward object or the rearward object is equal to or more than the first specific value, the parking control unit senses the lateral object through the lateral object sensing unit,
- when a left-side object is sensed and the distance from the left-side object is equal to or more than a second specific value, the parking control unit determines the exiting mode as left parallel exiting, and controls steering angle adjustment such that the vehicle moves through the determined exiting mode, and
- when a right-side object is sensed and the distance from the right-side object is equal to or more than the second specific value, the parking control unit determines the exiting mode as right parallel exiting, and controls steering angle adjustment such that the vehicle moves through the determined exiting mode,
- wherein when the forward object and the rearward object are not sensed, the lateral object is sensed, and the distance from the lateral object equal to or more than the second specific value, the parking control unit determines the exiting mode as perpendicular exiting and controls steering angle adjustment such that the vehicle moves through the determined exiting mode,
- wherein when a plurality of exiting paths are determined, the parking control unit calculates a distance to an exit through each of the plurality of exiting paths, selects an optimal exiting path among the plurality of exiting paths, the optimal exiting path having the shortest distance required for exiting, and informs a driver of the optimal exiting path or controls steering angle adjustment such that the vehicle enters to the optimal exiting path.

2. The smart parking assist system according to claim 1, wherein when the distance from the forward object or the rearward object is less than the first specific value or the distance from the right-side object or the left-side object is less than 2 m, the parking control unit determines that the vehicle does not perform exiting.

3. The smart parking assist system according to claim 1, wherein when the forward object or rearward object is not sensed through the forward object sensing unit or the rearward object sensing unit, a lateral object is sensed through the lateral object sensing unit, and the distance from the lateral object falls within the second specific value, the parking control unit determines that the vehicle does not perform exiting.

4. An apparatus for automatically selecting an exiting mode of a vehicle, which has been parked in a parking spot, to operate the vehicle to leave from the parking spot, in a smart parking assist system, the apparatus configured to determine whether the vehicle exits in a situation where the vehicle has been parked parallel or perpendicular, by using one or more object sensing units to sense one or more obstacles existed around the vehicle parked in the parking spot, wherein the object sensing units of the apparatus comprises:
- a forward object sensing unit is configured to sense whether an object exists at the front of the vehicle parked in the parking spot;
- a lateral object sensing unit is configured to sense whether an object exists at a side of the vehicle parked in the parking spot; and
- a rearward object sensing unit is configured to sense whether an object exists at the rear of the vehicle parked in the parking spot, and
- the apparatus configured to perform, when the vehicle is determined to be able to leave from the parking spot, an exit of the vehicle to drive the vehicle from the parking spot by automatically selecting the exiting mode based on the sensed objects and distances from the sensed objects by using an object distance calculation unit, a parking control unit and a steering angle adjusting unit, wherein the apparatus further comprises:
- the object distance calculation unit is configured to calculate the distances from the objects sensed through the forward object sensing unit, the lateral object sensing unit and the rearward object sensing unit;
- the parking control unit is configured to
  - determine left parallel exiting, right parallel exiting, and perpendicular exiting based on the distance from a forward object sensed through the forward object sensing unit, the distance from a rearward object sensed through the rearward object sensing unit, and the distance from a lateral object sensed through the lateral object sensing unit, and
  - control steering angle adjustment to drive the vehicle from the parking spot such that the vehicle moves through the determined left parallel exiting, right parallel exiting, and perpendicular exiting; and the steering angle adjusting unit is configured to adjust a steering angle according to a steering control signal of the parking control unit, wherein when the forward object is sensed or a rearward object is sensed, the parking control unit determines whether a distance from the forward object or the rearward object is equal to or more than a first specific value, when the distance from the forward object or the rearward object is equal to or more than the first specific value, the parking control unit senses the lateral object through the lateral object sensing unit, when a left-side object is sensed and the distance from the left-side object is equal to or more than a second specific value, the parking control unit determines the exiting mode as left parallel exiting, and controls steering angle adjustment such that the vehicle moves through the determined exiting mode, and when a right-side object is sensed and the distance from the right-side object is equal to or more than the second specific value, the parking control unit determines the exiting mode as right parallel exiting, and controls steering angle adjustment such that the vehicle moves through the determined exiting mode, wherein when the forward object and the rearward object are not sensed, the lateral object is sensed, and the distance from the lateral object equal to or more than the second specific value, the parking control unit determines the exiting mode as perpendicular exiting and controls steering angle adjustment such that the vehicle moves through the determined exiting mode, and wherein when a plurality of exiting paths are determined, the parking control unit calculates the number of left and right turns, which is required until the vehicle arrives at an exit through each of the plurality of exiting paths, selects an optimal exiting path among the plurality of exiting paths, the optimal exiting path having the smallest number of right and left turns, and informs a driver of the optimal exiting path or controls steering angle adjustment such that the vehicle enters to the optimal exiting path.

5. A method for automatically selecting an exiting mode of a vehicle, which has been parked in a parking spot, to operate the vehicle to leave from the parking spot, in a smart parking assist system, the method comprising:

determining whether the vehicle exits in a situation where the vehicle has been parked parallel or perpendicular, by using one or more object sensing units to sense one or more obstacles existed around the vehicle parked in the parking spot, wherein the method comprises:
(a) sensing, by one or more object sensors, whether an object exists at the front, side or rear of a vehicle;

performing, when the vehicle is determined to be able to leave from the parking spot, an exit of the vehicle to drive the vehicle from the parking spot by automatically selecting the exiting mode based on the sensed object and distances from the sensed object by using an object distance calculation unit, a parking control unit and a steering angle adjusting unit, wherein the method further comprises:
(b) calculating, by the object distance calculation unit, the distance from the object sensed at the front, side or rear of the vehicle;
(c) determining, by the parking control unit, one or more exiting modes according to a distance relation between the vehicle and the object sensed at the front, side or rear of the vehicle; and
(d) adjusting, by the steering angle adjusting unit, a steering angle to drive the vehicle from the parking spot according to the determined exiting mode, wherein the step (c) comprises,
determining whether a distance from a forward object or rearward object is equal to or more than a first specific value,
calculating a distance from a lateral object when the distance from the forward object or rearward object is equal to more than the first specific value,
determining, when a right-side object is sensed and a distance from a right-side object is equal to or more than a second specific value, the exiting mode as right parallel exiting, and
determining, when a left-side object is sensed and a distance from a left-side object is equal to or more than a second specific value, the exiting mode as left parallel exiting, wherein at the step (c),
when the distance from the forward object or rearward object is less than the first specific value, the exiting mode is determined as a state in which the vehicle does not perform exiting, and
when the distance from the right-side object or the left-side object falls within the second specific value, the exiting mode is determined as a state in which the vehicle does not perform exiting, and wherein at the step (c),
when a plurality of exiting modes are determined, a distance to an exit in each of the exiting modes is calculated, and an exiting mode having the shortest distance required for exiting among the plurality of exiting modes is selected as the optimal exiting mode.

6. The smart parking assist method according to claim 5, wherein at the step (c),
when the forward object or rearward object is not sensed and the distance from the lateral object equal to or more than the a second specific value, the exiting mode is determined as perpendicular exiting.

* * * * *